United States Patent [19]
Kodama et al.

[11] Patent Number: 5,995,195
[45] Date of Patent: *Nov. 30, 1999

[54] METHOD AND APPARATUS FOR EXPOSING PHOTOSENSITIVE MATERIALS

[75] Inventors: Kenichi Kodama; Kensuke Goda, both of Kanagawa, Japan

[73] Assignee: Fuji Photo Film Co., Ltd., Kanagawa, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/695,571

[22] Filed: Aug. 12, 1996

Related U.S. Application Data

[62] Division of application No. 08/262,983, Jun. 21, 1994, Pat. No. 5,573,894.

[30] Foreign Application Priority Data

Jun. 21, 1993 [JP] Japan .................................. 5-149372

[51] Int. Cl.$^6$ .................................................. G03B 27/54
[52] U.S. Cl. ................................. 355/37; 355/70; 347/238
[58] Field of Search ............................... 355/67, 70, 400, 355/402, 32, 37; 347/232, 233, 234, 238, 243, 261; 395/216, 220, 221

[56] References Cited

U.S. PATENT DOCUMENTS

| | | | |
|---|---|---|---|
| 4,821,113 | 4/1989 | McQuade et al. | 358/75 |
| 4,876,569 | 10/1989 | Nishitoku | 355/68 |
| 5,014,075 | 5/1991 | Okino | 346/108 |
| 5,121,137 | 6/1992 | Taki et al. | 346/108 |
| 5,254,455 | 10/1993 | Hinz et al. | 430/584 |
| 5,274,398 | 12/1993 | Ban | 346/108 |
| 5,625,402 | 4/1997 | Sarraf | 347/232 |

FOREIGN PATENT DOCUMENTS

| | | | |
|---|---|---|---|
| 5199372 | 8/1993 | Japan | H04N 1/04 |
| 6127021 | 5/1994 | Japan | B41J 2/44 |

*Primary Examiner*—Safet Metjahic
*Assistant Examiner*—John Chizmar
*Attorney, Agent, or Firm*—Sughrue, Mion, Zinn, Macpeak & Seas, PLLC

[57] ABSTRACT

An apparatus for exposing photosensitive materials includes a plurality of light sources for generating beams having different wavelengths, a polygon mirror for scanning and exposing the beams toward a color photosensitive material, and one or more f θ lenses disposed on an optical path between the photosensitive material and the polygon mirror. The polygon mirror and the f θ lenses are arranged, with respect to the beam from a light source having an intermediate wavelength among the light sources, such that reflection points corresponding to both ends of beam scanning on reflection surfaces of the polygon mirror pass through an identical point on an optical axis of the f θ lenses, and light beams at the both ends of beam scanning have line symmetry with respect to the optical axis of the f θ lenses.

4 Claims, 6 Drawing Sheets

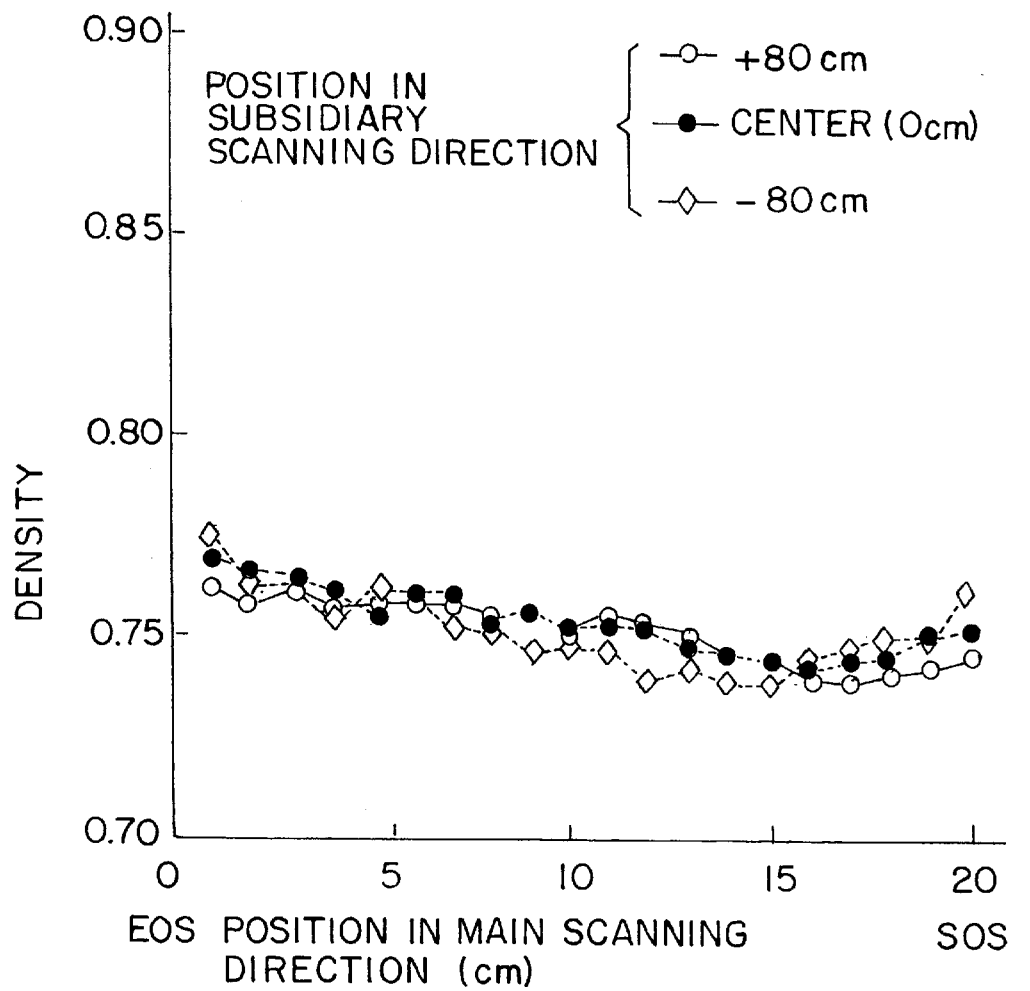

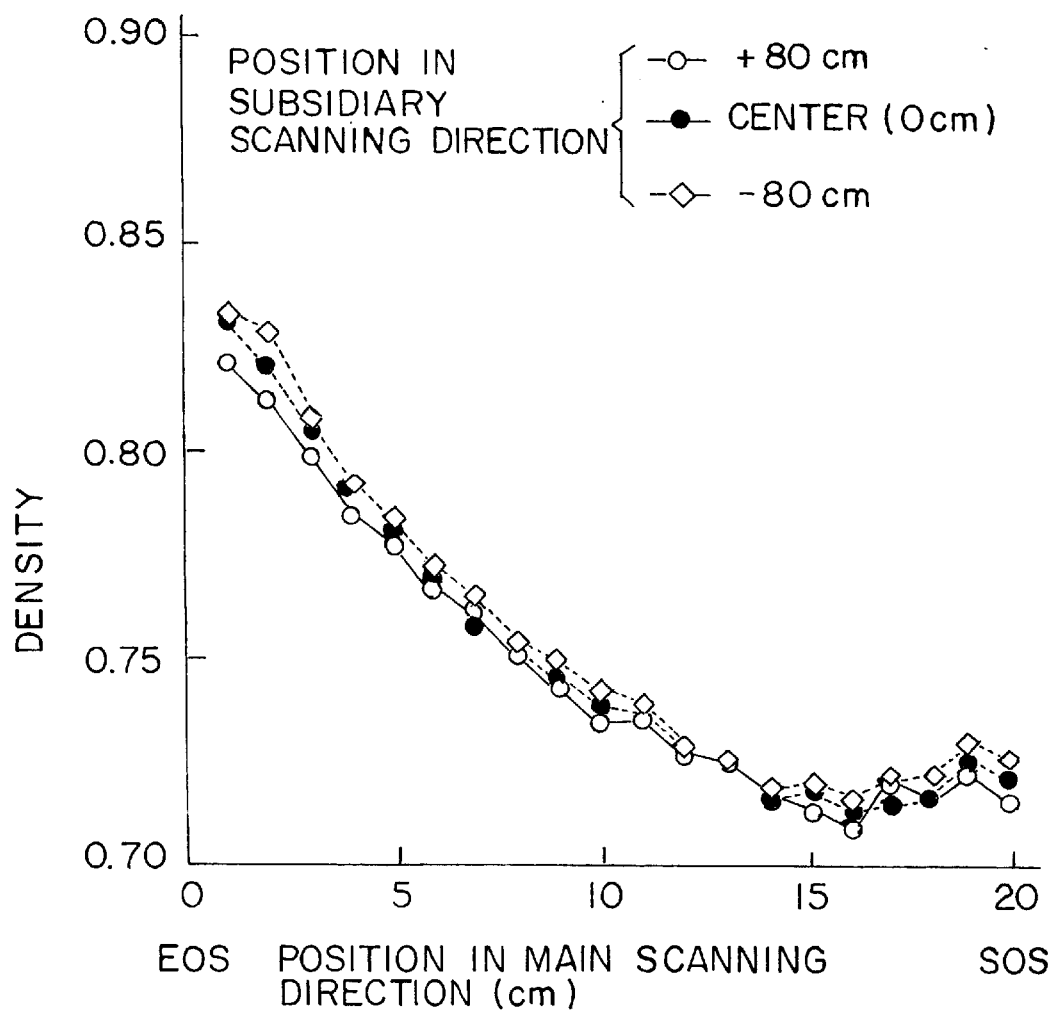

METHOD AND APPARATUS FOR EXPOSING PHOTOSENSITIVE MATERIALS

This is a divisional of application Ser. No. 08/262,983 filed Jun. 21, 1994.

FIELD OF THE INVENTION

The present invention relates to a method and an apparatus for exposing a photosensitive material having at least three layers having different spectral sensitivities by means of laser beams, and in particular relates to an exposing method and an apparatus in which curvature of field is minimized so that exposure is performed accurately.

DESCRIPTION OF THE RELATED ART

An exposing apparatus, in which a laser beam irradiated from a semiconductor laser is reflected by a polygon mirror (rotatable polygon mirror) toward a photosensitive material so as to scan and expose the photosensitive material, is adopted in a printer and the like and known. When a color photosensitive material having spectral sensitivities of at least three layers is used as the photosensitive material, at least three semiconductor lasers having different irradiation wavelengths are also required as light sources.

In order to expose a photosensitive material at a high resolution by using a semiconductor laser, a beam diameter may be converged to less than or equal to a set value so as to increase an amount of light per unit area. However, it is difficult for light of a long wavelength to converge the beam diameter, and in order for the long wavelength light to have a set beam diameter, it is necessary to select and arrange optical system members such as f θ lenses, cylindrical lenses and the like. When these members are arranged by using the long wavelength light as a standard, beam diameters at both ends in a direction of beam main scanning and at a center become values which are the same as the values which had been set therefor. When a set beam diameter is obtained for the long wavelength light by arranging optical system members adapted to the long wavelength light, a desired beam diameter is also obtained in a short wavelength because it is easier to converge the beam diameter in the short wavelength than in the long wavelength.

A silver halide color photosensitive material provides a color generation density which principally depends on an exposure amount (light amount×exposure time). Some photosensitive materials have color generation layers in which the color generation density depends on a beam diameter. Namely, in the case of such a photosensitive material, even when the laser beam has a constant intensity, the light density becomes low as the beam diameter becomes large, so that the color generation density decreases proportionately to the decrease in the light. Therefore, with respect to the photosensitive material in which the color generation density greatly depends on variation in beam diameter, it is necessary to make the variation in beam diameter as small as possible.

When arrangement of an optical system is set using long wavelength light as a standard as described above, a proper focus position and a beam diameter are obtained for the long wavelength light, however, the curvature of field becomes large with respect to short wavelength light. As a result, in the case of the short wavelength light, the beam diameter is different between both ends in a scanning direction and a center, and variation in beam diameter during one scanning becomes extremely large. Thus, a problem arises in that shading, in which the color generation density differs in a main scanning direction, occurs in a photosensitive material which makes color generation by irradiation of short wavelength light and has a density which depends on the beam diameter.

Further, in order to prevent shading, it is necessary to perform optical adjustment with respect to the short wavelength light producing different color generation densities which depend on the beam diameters, so that beam diameters of the light coincide at a plurality of positions on a scanning line. However, in order for the beam diameters to coincide at a plurality of positions in a scanning direction, it is necessary to adjust the arrangement of the respective device of an optical system at each position, and a drawback arises in that adjustment time becomes extremely long.

SUMMARY OF THE INVENTION

An object of the present invention is to solve the aforementioned problems in the related art, and to provide a method and an apparatus for exposing photosensitive materials in which shading resulting from an optical system can be reduced, and adjustment of the beam diameter therefor is easy.

According to one aspect of the present invention, there is provided an apparatus for exposing photosensitive materials comprising:

a plurality of light sources for generating beams having different wavelengths;

a rotatable polygon mirror for scanning and exposing a photosensitive material by reflecting the beams toward the photosensitive material; and one or more f θ lenses disposed on an optical path between the photosensitive material and said polygon mirror;

wherein said polygon mirror and said f θ lenses are arranged, with respect to the beam from a light source having an intermediate wavelength among said light sources, such that reflection points corresponding to both ends of beam scanning on reflection surfaces of said polygon mirror pass through an identical point on an optical axis of said f θ lenses, and light beams at the both ends of beam scanning have line symmetry with respect to the optical axis of said f θ lenses.

Herein 750 nm is preferable as the intermediate wavelength, and as the photosensitive material, a photosensitive material which has a silver halide emulsion layer having a steep spectral sensitivity distribution in an infrared region is preferable.

According to a second aspect of the present invention, there is provided an apparatus for exposing photosensitive materials comprising:

a plurality of light sources for generating beams having different wavelengths;

a rotatable polygon mirror for scanning and exposing a photosensitive material by reflecting the beams toward the photosensitive material; and one or more f θ lenses disposed on an optical path between the photosensitive material and said polygon mirror;

wherein said photosensitive material has at least one layer of a silver halide emulsion layer spectrally sensitized by a sensitizing dye for forming a J aggregate, and wherein said polygon mirror and said f θ lenses are arranged, with respect to the beam from a light source among said light sources having a wavelength which is selected to expose the silver halide emulsion layer spectrally sensitized by the sensitizing dye for forming the J aggregate, such that reflection points corresponding to both ends of beam scanning on reflection surfaces of said polygon mirror pass through an identical point on an optical axis of said f θ lenses, and light beams at the both ends of beam scanning have line symmetry with respect to the optical axis of said f θ lenses.

Further, according to a third aspect of the present invention, there is provided a method for exposing photosensitive materials by using a plurality of light sources having different wavelengths comprising the steps of:

exposing a photosensitive material in a main scanning direction by reflecting a beam from one light source through one or more f θ lenses toward the photosensitive material by means of a rotatable polygon mirror;

moving the photosensitive material in a sub-scanning direction; and switching the light source to another light source having a different wavelength;

wherein said polygon mirror and said f θ lenses are arranged, with respect to the beam from a light source having an intermediate wavelength among said plurality of light sources having different wavelengths, such that reflection points corresponding to both ends of beam scanning on reflection surfaces of said polygon mirror pass through an identical point on an optical axis of said f θ lenses, and light beams at the both ends of beam scanning have line symmetry with respect to the optical axis of said f θ lenses.

Further, according to a fourth aspect of the present invention, there is provided a method for exposing color photosensitive materials by using a plurality of light sources having different wavelengths comprising the steps of:

exposing a photosensitive material in a main scanning direction by reflecting a beam from one light source through one or more f θ lenses toward the color photosensitive material by means of a rotatable polygon mirror;

moving the photosensitive material in a sub-scanning direction; and switching the light source to another light source;

wherein said photosensitive material has at least one layer of a silver halide emulsion layer spectrally sensitized by a sensitizing dye for forming a J aggregate, and wherein said polygon mirror and said f θ lenses are arranged, with respect to the beam from the light source having a wavelength selected to expose the silver halide emulsion layer spectrally sensitized by the sensitizing dye for forming the J aggregate, such that reflection points corresponding to both ends of beam scanning on reflection surfaces of said polygon mirror pass through an identical point on an optical axis of said f θ lenses, and light beams at the both ends of beam scanning have line symmetry with respect to the optical axis of said f θ lenses.

As the light source in the present invention, it is possible to use laser emitting units such as semiconductor lasers, gas lasers and the like, and LED.

In the present invention, it is possible to reduce shading resulting from variation in beam diameter of the light source for exposure. Therefore, the exposing apparatus and the exposing method of the present invention are extremely effective for exposing photosensitive materials in which the color generation density greatly depends on variation in beam diameter.

BRIEF DESCRIPTION OF THE DRAWINGS

FIG. 5 is a graph showing color generation densities in a main scanning direction by exposure according to the present invention; and FIG. 6 is a graph showing color generation densities in a main scanning direction by exposure in the prior art.

DETAILED EXPLANATION OF THE PREFERRED EMBODIMENTS

Figure 1:
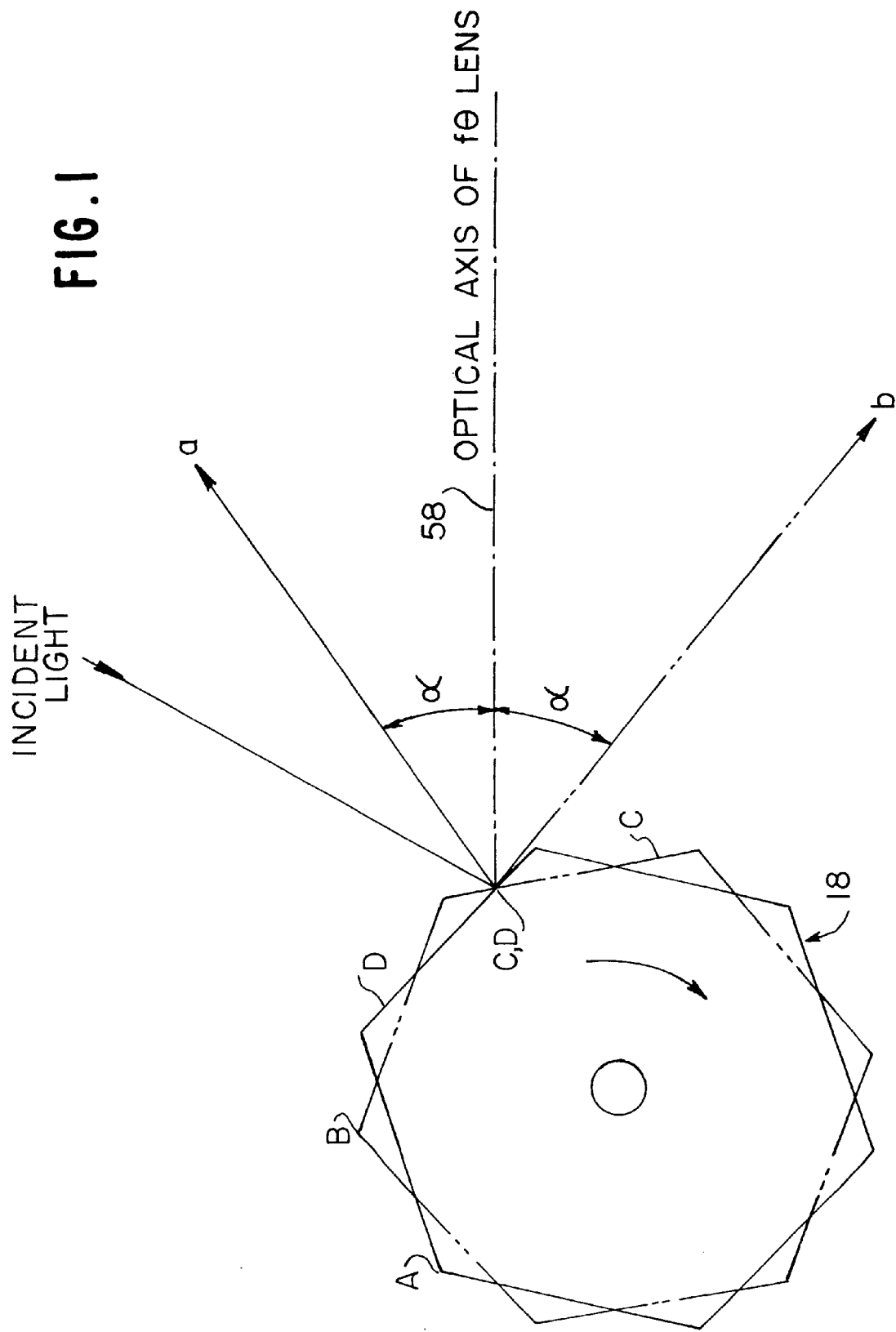
FIG. 1 is an explanatory view showing optical system arrangement according to the present invention.

The present inventors have found that when the polygon mirror and the f θ lens are arranged such that the reflection points corresponding to the both ends of beam scanning on the reflection surfaces of the polygon mirror pass through the identical point on the optical axis of the f θ lens, the beam diameters at the both ends in the scanning direction become equal. When the beam diameters are equal at the both ends in the scanning direction, the beam diameters become symmetrical at both sides of the optical axis of the f θ lens on the scanning line, so that variation in beam diameter on one scanning line is suppressed, and shading can be reduced.

According to knowledge of the present inventors, it has been found that the depending ratio of the color generation density on the beam diameter is highest in color generation of the emulsion layer containing the sensitizing dye for forming the J aggregate. Thus, light of a wavelength for generating this color is used as a standard for an optical design, and the curvature of field on the photosensitive material is decreased. Concretely, the polygon mirror and the f θ lens are arranged such that the reflection points of the light of the wavelength for generating the color at the both end positions in the main scanning on the polygon mirror pass through the identical point on the optical axis of the f θ lens, and the light beams at the both ends of beam scanning are in axial symmetry with respect to the optical axis of the f θ lens. Thereby, the surface incoming and outgoing amounts of the polygon mirror are in symmetry at the right and left in the main scanning direction using the optical axis of the f θ lens as a center, and the beam diameter approaches a constant irrelevant to scanning positions, so that the beam diameter can be matched by an easy adjustment operation.

In addition, the light used as the standard of the optical design has a small change in beam diameter during one scanning, so that this light is used to expose the color generation layer containing the sensitizing dye for forming the J aggregate, thereby it is possible to reduce shading in color generation subject to be affected by variation in beam diameter, and the image quality is improved. Further, the light of the intermediate wavelength in the optical design has small curvature of field, and the beam diameter scarcely changes at scanning positions, so that the amount of curvature of field is small, and the curvature of field is symmetrical with respect to the optical axis of the f θ lens, and hence it is enough for adjustment of the beam diameter to be performed at one place which is the center of the beam scanning, and the adjustment becomes easy. Furthermore, with respect to other light beams, the beam diameter dependency of the color generation density of the color generation layer to be irradiated is small, so that it is sufficient for the adjustment of the beam diameter to be performed at one place which is the center of the beam scanning.

In the present invention, the silver halide emulsion to be exposed by the laser emitting unit to be used as the central wavelength in the optical design is preferably a photosensitive emulsion layer having a steep spectral sensitivity distribution at an infrared region. Concretely, it is a silver halide emulsion spectrally sensitized such that a wavelength which provides a maximal spectral sensitivity is not less than 700 nm and not more than 900 nm, and such that a spectral sensitivity for light having a wavelength longer than the wavelength providing the maximal spectral sensitivity by 20 nm is not more than ⅓ of the maximal spectral sensitivity. The photosensitive material having such a silver halide emulsion layer is excellent in color separation, however, it has large dependency on variation in beam diameter as described above. Therefore, if the exposing apparatus for exposing the photosensitive material has a large variation in beam diameter on the photosensitive material surface, even when the photosensitive material has excellent color separation, the photosensitive material cannot exhibit its original color separation performance.

With respect to the photosensitive emulsion layer containing the silver halide, the reason why the sensitivity variation occurs due to the change in laser beam diameter has not become apparent, however, it is believed that the variation is determined by illuminance and time of laser emission and a degree of influence of a multiple exposure effect on the photosensitive material. Namely, in a scanning exposure system in which the beam is scanned at a constant speed (in a main scanning direction) and the photosensitive material is driven at a constant speed (in a sub-scanning direction), as the laser beam is more converged, the illuminance per unit area increases, and the number of exposure performed repeatedly in the sub-scanning direction (multiple exposure degree) decreases. This means, for the photosensitive material, that exposure at an extremely high illuminance and for a short time period has been performed, and the exposure operation has been made rapid. On the other hand, when the beam diameter increases, light having a relatively low illuminance is repeatedly irradiated, and the exposure operation takes a long time period.

Herein, a value obtained by dividing a change amount ($\mu$m) of the laser beam diameter by the beam diameter ($\mu$m) is defined as P, and a value obtained by dividing a rising width ($\Delta$logE) of sensitivity generated by the change in beam diameter by P is defined as Q. Generally a Q value of a photosensitive material suitable for high illumination and short time exposure by a laser diode is negative, and it can be said that one having a larger absolute value of Q is a photosensitive material having a larger sensitivity variation due to the beam diameter.

The fact that the sensitivity variation occurs due to the beam diameter in the photosensitive emulsion containing silver halide is not especially new. An extent of the variation may change depending on conditions such as a preparation method of the silver halide emulsion to be used, an adding amount of raw materials to be used, a method for constituting the photosensitive material (layer construction) and the like. Namely, as factors for generating the sensitivity variation, there can be exemplified a type or an amount of multivalent metal ion to be doped during a formation process of silver halide emulsion particles, a type and an amount of an additive used for chemical sensitization, a temperature, time, pH or pAg during a chemical sensitization step and the like. Further, it has been also found that when a certain dye which can form a sharp spectral sensitivity distribution depending on a type, an adding amount and an adding condition of a sensitizing dye used for spectral sensitization, or a dye which forms a so-called J aggregate is used, the aforementioned Q value remarkably lowers, and the degree of dependency on the beam diameter variation is large. Further, it has been also found that the Q value greatly rises or lowers due to existence of an additive aimed at prevention of fogging.

Next, the thiadicarbocyanine dye used in the present invention will be explained in detail. In the present invention, those represented by a general formula 1 or a general formula 2 are preferably used.

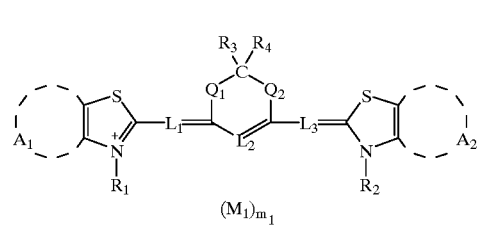

(1)

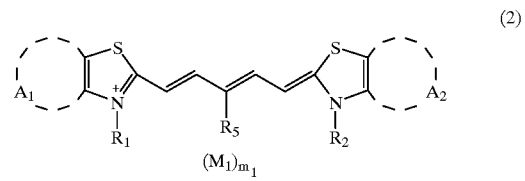

(2)

In the general formula 1, $Q_1$ and $Q_2$ represent a methylene group respectively, and $R_1$ and $R_2$ represent an alkyl group respectively. $R_3$ and $R_4$ represent a hydrogen atom, an alkyl group, an aryl group or a heterocyclic group respectively, and $R_3$ and $R_4$ are not a hydrogen atom at the same time. $L_1$, $L_2$ and $L_3$ represent a methine group respectively. $A_1$ and $A_2$ represent an atomic group necessary to form a benzene ring or a naphthalene ring respectively. Mutual bonding may be made between $R_1$ and $L_1$ and between $R_2$ and $L_3$ to form a ring respectively. $M_1$ represents an electric charge-balanced counter ion, and $m_1$ represent a value necessary to neutralize an electric charge.

The alkyl group represented by $R_1$ and $R_2$ may be substituted, and is preferably alkyl groups having 1–18 carbons, for example, methyl group, ethyl group, propyl group, butyl group, pentyl group, octyl group, decyl group, dodecyl group and octadecyl group. In addition, when the alky group has a substituent, the substituents are preferably sulfonic group, carboxyl group, cyano group and the like.

The alkyl group represented by $R_3$ and $R_4$ may be substituted, and is preferably alkyl groups having 1–10 carbons, for example, methyl group and ethyl group.

A ring may be mutually formed between $R_1$ and $L_1$ and between $R_2$ and $L_3$. Preferably they have carbon atoms for forming non-substituted 5-, 6- or 7-membered ring, and more preferably they have carbon atoms for forming 6-membered ring.

Preferably $R_1$ and $R_2$ are non-substituted alkyl groups (for example, methyl group, ethyl group, n-propyl group and n-butyl group) and sulfoalkyl groups (for example, 2-sulfoethyl group, 3-sulfopropyl group, 4-sulfobutyl group, 3-sulfobutyl group), while a case is also preferable in which mutual bonding is made between $R_1$ and $L_1$ and between $R_2$ and $L_3$ respectively to form a 5-membered ring or a 6-membered ring.

The aryl group represented by $R_3$ and $R_4$ may be substituted, for example, phenyl group can be exemplified. The heterocyclic group represented by $R_3$ and $R_4$ is, for example, 2-pyridyl group, 2-thiazoyl group, 2-furyl group and 2-quinolyl group. $R_3$ and $R_4$ are preferably hydrogen atom, methyl group, ethyl group, phenyl group and the like.

The benzene ring or the naphthalene ring completed by $A_1$ and $A_2$ may be substituted, which may have a substituent in this case, for example, halogen atom such as chlorine atom and the like; hydroxyl group; alkyl group such as methyl group and the like; alkoxy group such as methoxy group, ethoxy group and the like; aryl group such as phenyl group and the like; carboxy group; cyano group; amino group; sulfonic group and the like.

$M_1$ is, for example, anion such as halide ion (bromide ion, iodide ion and the like), perchlorate ion, paratoluene-sulfonate ion and the like; and cation such as triethylam-monium ion, sodium ion and the like.

Incidentally, when the dye molecule itself forms a intramolecular salt to hold the balance of electric charge, $m_1$ is 0.

In the general formula 2, $R_1$ and $R_2$ represent an alkyl group respectively, concrete examples of which are the same as those in the general formula 1. $R_5$ represents an alkyl group, an aryl group or a heterocyclic group, concrete examples of which are the same as those exemplified for $R_3$ and $R_4$ in the general formula 1. Among them, methyl group, ethyl group, benzyl group and the like are preferable.

The benzene ring or the naphthalene ring completed by $A_1$ and $A_2$, and rings formed by $R_1$ and a methine group and $R_2$ and a methine group are the same as those in the general formula 1.

Concrete examples of the thiadicarbocyanine dye preferably used for the present invention are shown in formulae 3 to 12 and Tables 1 to 4, however, there is no limitation thereto. Incidentally, combinations of $R_1$, $R_2$ and the like in the formula 3 are shown in Table 1, Table 2 and Table 3, and combinations of $R_1$, $R_2$ and the like in the formula 10 are shown in Table 4.

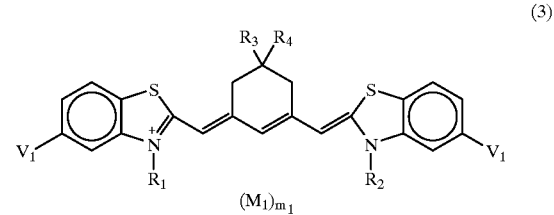

(3)

TABLE 1

| Dye No. | $R_1$ | $R_2$ | $R_3$ | $R_4$ | $V_1$ | $M_1$ | $m_1$ |
|---|---|---|---|---|---|---|---|
| D-1 | $C_2H_5$ | $C_2H_5$ | $CH_3$ | H | H | $I^-$ | 1 |
| D-2 | " | " | " | " | Cl | $ClO_4^-$ | 1 |
| D-3 | " | " | " | " | $CH_3$ | " | 1 |
| D-4 | " | " | " | " | " | $I^-$ | 1 |
| D-5 | " | " | " | " | $OCH_3$ | $ClO_4^-$ | 1 |
| D-6 | " | " | " | " | " | 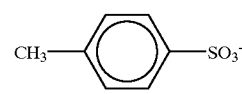 | 1 |
| D-7 | " | " | " | " | $OC_2H_3$ | $I^-$ | 1 |
| D-8 | " | " | " | " | OH | $I^-$ | 1 |
| D-9 | $(CH_2)_3SO_3^-$ | $(CH_2)_2SO_3^-$ | " | " | H | $HN(C_2H_3)_3^-$ | 1 |
| D-10 | $C_2H_5$ | $(CH_2)_3SO_3^-$ | " | " | $OCH_3$ | — | 1 |
| D-11 | " | " | " | " | $CH_3$ | — | 1 |

TABLE 2

| Dye No. | $R_1$ | $R_2$ | $R_3$ | $R_4$ | $V_1$ | $M_1$ | $m_1$ |
|---|---|---|---|---|---|---|---|
| D-12 | $(CH_2)_3SO_3^-$ | $(CH_2)_3SO_3^-$ | $CH_3$ | H | $CH_3$ | $HN(C_2H_5)_3^+$ | 1 |
| D-13 | " | " | " | " | $OCH_3$ | " | 1 |
| D-14 | $C_2H_5$ | $C_2H_5$ | $C_2H_5$ | " | H | $I^-$ | 1 |
| D-15 | " | " | " | " | " | $ClO_4^-$ | 1 |
| D-16 | $(CH_2)_3SO_3^-$ | $(CH_2)_3SO_3^-$ | " | " | $OCH_3$ | $HN(C_2H_5)_3^+$ | 1 |
| D-17 | $C_2H_5$ | $C_2H_5$ | $-CH_2-C_6H_5$ | " | H | $I^-$ | 1 |
| D-18 | " | " | " | " | " | $ClO_4^-$ | 1 |
| D-19 | " | " | " | " | " | $CH_3-C_6H_4-SO_3^-$ | 1 |
| D-20 | $(CH_2)_3SO_3^-$ | $(CH_2)_3SO_3^-$ | " | " | " | $HN(C_2H_5)_3^+$ | 1 |
| D-21 | $(CH_2)_4SO_3^-$ | $(CH_2)_4SO_3^-$ | " | " | " | $Na^+$ | 1 |
| D-22 | $n\text{-}C_3H_7$ | $n\text{-}C_3H_7$ | " | " | " | $I^-$ | 1 |
| D-23 | $CH_3$ | $CH_3$ | " | " | " | $I^-$ | 1 |

TABLE 3

| Dye No. | $R_1$ | $R_2$ | $R_3$ | $R_4$ | $V_1$ | $M_1$ | $m_1$ |
|---|---|---|---|---|---|---|---|
| D-24 | $C_2H_5$ | $C_2H_5$ | $-CH_2-C_6H_5$ | H | Cl | $Br^-$ | 1 |
| D-25 | " | " | " | " | $CH_3$ | $I^-$ | 1 |
| D-26 | " | " | " | " | $OCH_3$ | $I^-$ | 1 |
| D-27 | $(CH_2)_3SO_3^-$ | $(CH_2)_3SO_3^-$ | " | " | " | $HN(C_2H_5)_3^+$ | 1 |
| D-28 | $C_2H_5$ | $(CH_2)_3SO_3^-$ | " | " | " | — | — |
| D-29 | " | " | " | " | H | — | — |
| D-30 | $C_2H_5$ | $C_2H_5$ | $-CH_2-C_6H_5$ | H | $OC_2H_5$ | $ClO_4^-$ | 1 |
| D-31 | " | " | $CH_3$ | $CH_3$ | H | $I^-$ | 1 |
| D-32 | " | " | " | " | $CH_3$ | $I^-$ | 1 |

TABLE 3-continued
| Dye No. | R₁ | R₂ | R₃ | R₄ | V₁ | M₁ | m₁ |
| --- | --- | --- | --- | --- | --- | --- | --- |
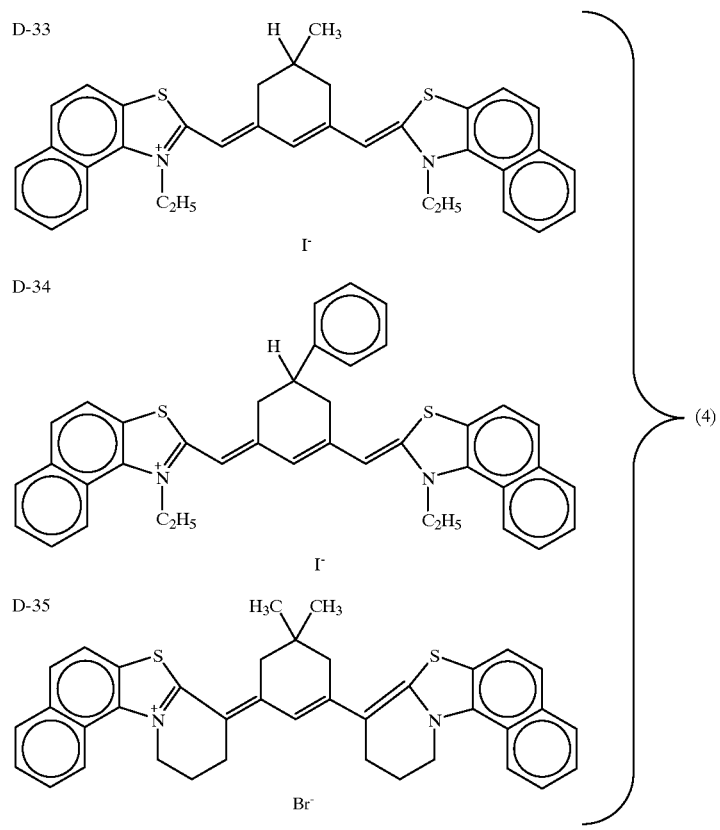
(4)

TABLE 3-continued
| Dye No. | R₁ | R₂ | R₃ | R₄ | V₁ | M₁ | m₁ |
| --- | --- | --- | --- | --- | --- | --- | --- |
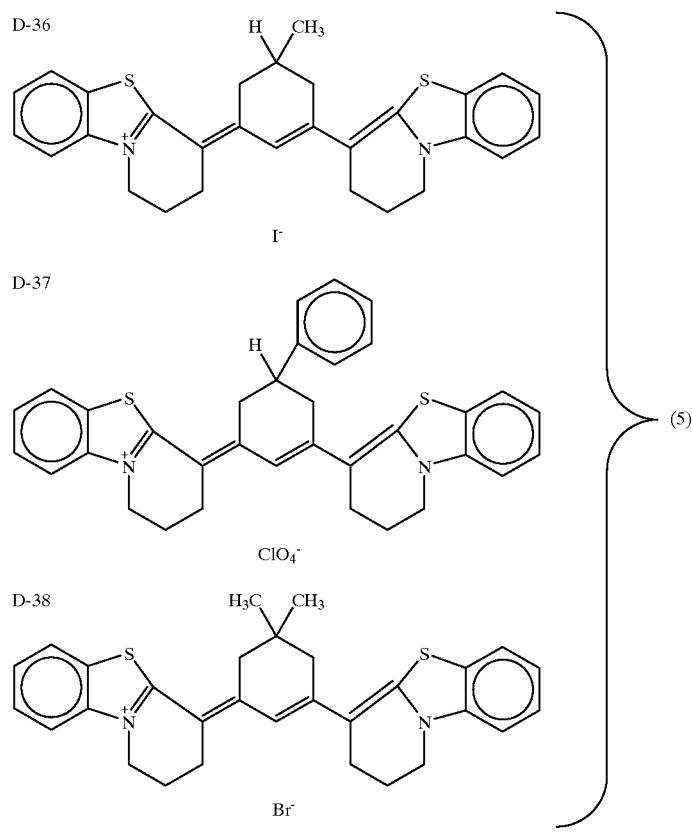
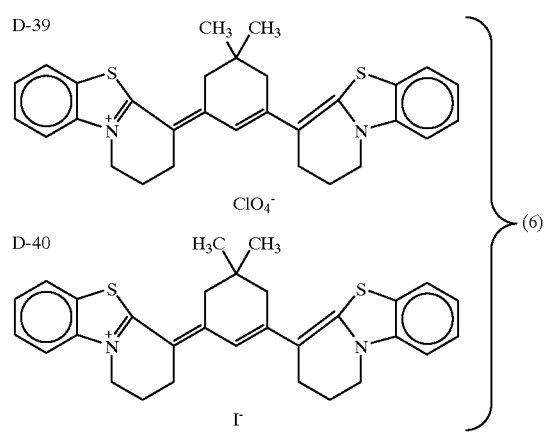

TABLE 3-continued
| Dye No. | $R_1$ | $R_2$ | $R_3$ | $R_4$ | $V_1$ | $M_1$ | $m_1$ |
|---------|-------|-------|-------|-------|-------|-------|-------|
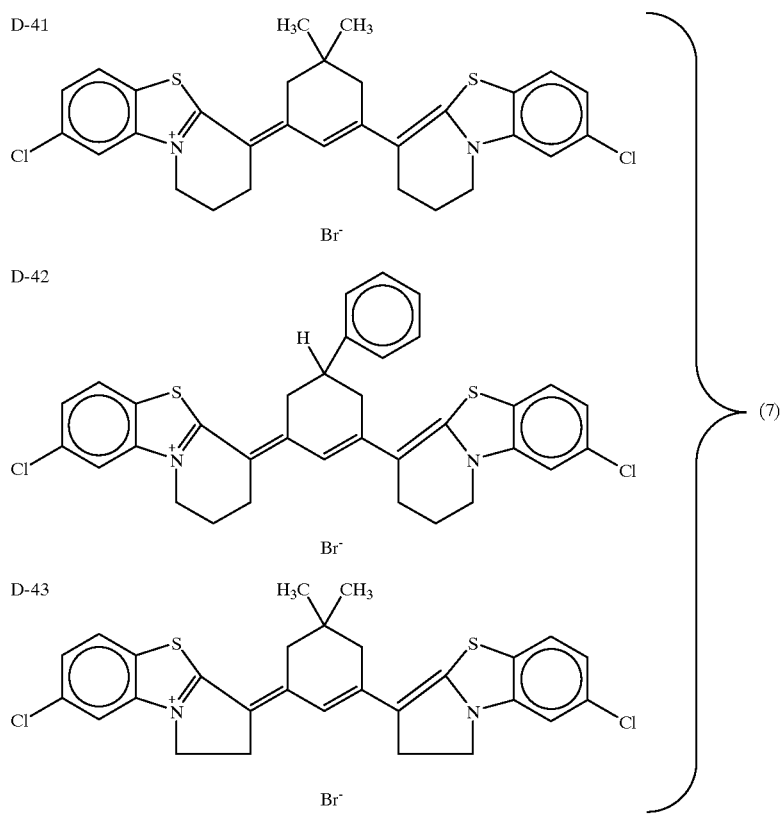
(7)

TABLE 3-continued
| Dye No. | R₁ | R₂ | R₃ | R₄ | V₁ | M₁ | m₁ |
|---------|----|----|----|----|----|----|-----|
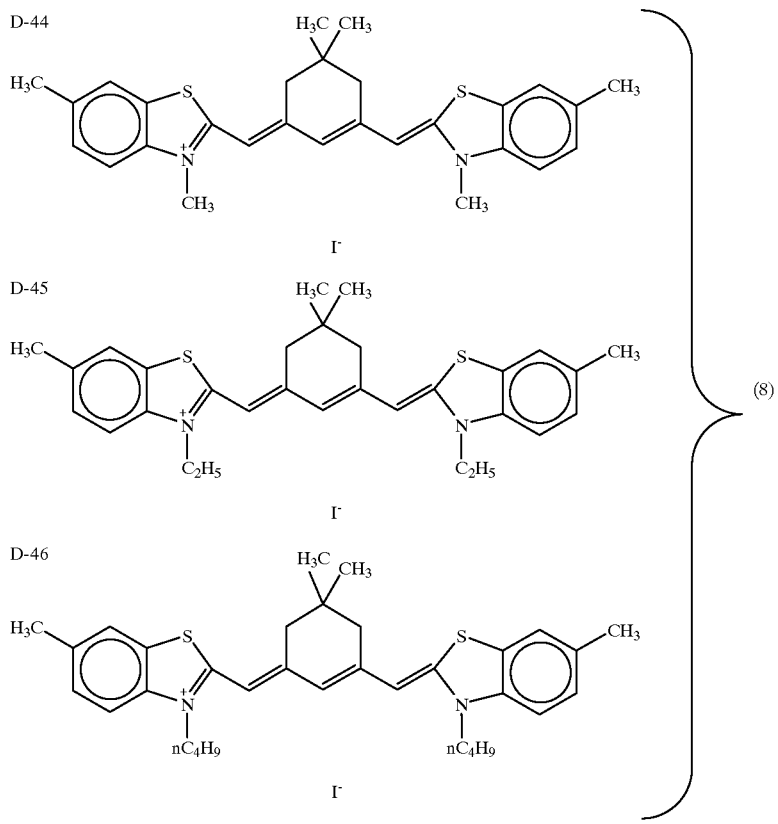
(8)

TABLE 3-continued

| Dye No. | R₁ | R₂ | R₃ | R₄ | V₁ | M₁ | m₁ |
|---------|----|----|----|----|----|----|----|

D-47, D-48, D-49: (structures shown, belonging to formula (9))

TABLE 4

| Dye No. | R₁ | R₂ | R₅ | V₁ | M₁ | m₁ |
|---------|-----|-----|-----|------|------|-----|
| d-50 | $(CH_2)_3SO_3^-$ | $(CH_2)_3SO_3^-$ | $CH_3$ | $OCH_3$ | $HN^+(C_2H_5)_3$ | 1 |
| D-51 | " | " | " | $CH_3$ | $HN^+(C_2H_5)_3$ | 1 |
| D-52 | $C_2H_5$ | $C_2H_5$ | $C_2H_5$ | —C₆H₄—CH₃ | $CH_3$—C₆H₄—$SO_3^-$ | 1 |
| D-53 | $(CH_2)_3SO_3^-$ | $(CH_2)_3SO_3^-$ | —CH₂—C₆H₅ | $CH_3$ | $HN^+(C_2H_5)_3$ | 1 |
| D-54 | $(CH_2)_4SO_3^-$ | $(CH_2)_4SO_3^-$ | " | " | $HN^+(C_2H_5)_3$ | 1 |
| D-55 | " | " | " | $OCH_3$ | $HN^+(C_2H_5)_3$ | 1 |

TABLE 4-continued
| Dye No. | $R_1$ | $R_2$ | $R_5$ | $V_1$ | $M_1$ | $m_1$ |
|---|---|---|---|---|---|---|
| D-56 | $(CH_2)_3SO_3^-$ | $(CH_2)_3SO_3^-$ | " | " | $HN^+(C_2H_5)_3$ | 1 |
| D-57 | $C_2H_5$ | $C_2H_5$ | " | $CH_3$ | $I^-$ | 1 |
| D-52 | " | " | " | " | $CH_3\text{-}C_6H_4\text{-}SO_3^-$ | 1 |
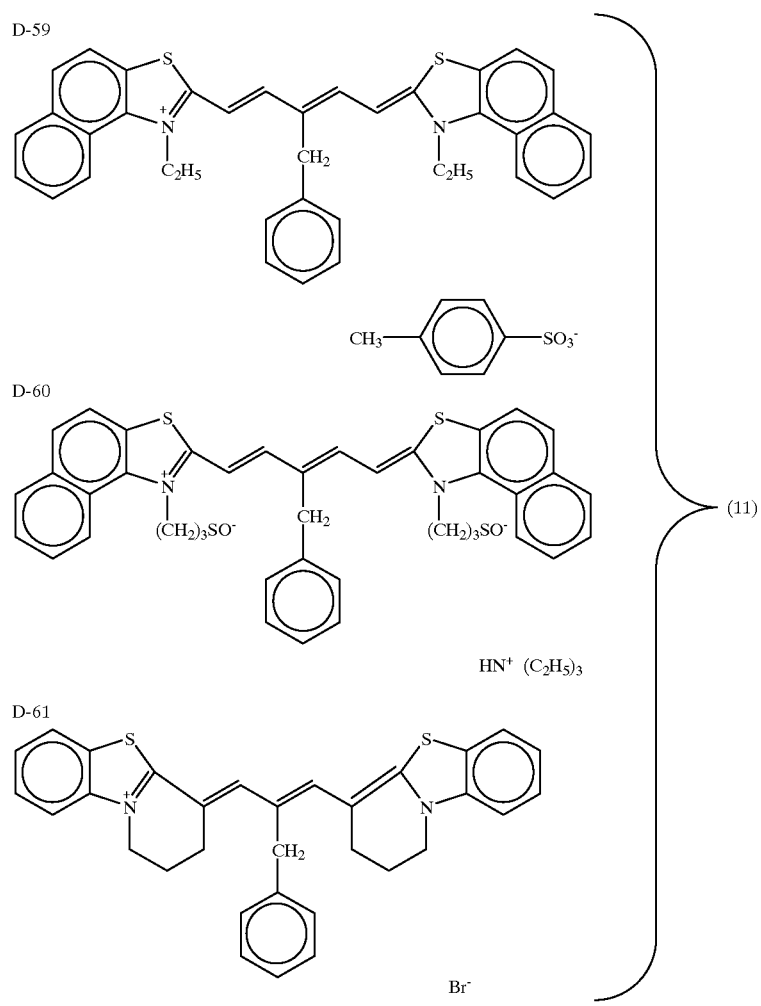
(11)

TABLE 4-continued

| Dye No. | R₁ | R₂ | R₅ | V₁ | M₁ | m₁ |
|---------|----|----|----|----|----|-----|

D-62, D-63, D-64 (12)

Among them, because absorptivity is good, the anion type sensitizing dye is apt to have a sharpened spectral sensitivity, and stability of an application solution is good for a long term, so that it is preferably employed. Further, the anion type dye is preferable because it is excellent in shelf stability in a green state.

The sensitizing dyes indicated above may be used alone, however, a combination of them may be used, or they may be combined with other known sensitizing dyes (for example, sensitizing dyes described in U.S. Pat. No. 4,617,257, Japanese Patent Laid-open Nos. 59-180550 and 60-140335, RD 17029 (1978), pp. 12–13 and the like). These combinations are often employed especially for a purpose of strong color sensitization.

A method for preparing the silver halide emulsion layer used in the present invention will be explained in detail hereinafter. The silver halide emulsion used for the present invention may be any of silver chloride, silver bromide, silver iodobromide, silver chlorobromide, silver iodochloride and silver chloroiodobromide, however, it is preferably silver iodobromide, silver chloride and silver chlorobromide containing not more than 10 mol % of silver iodide. The silver halide emulsion used in the present invention may be either a surface latent image type or an internal latent image type. The internal latent image type emulsion is used as a direct reversal emulsion in combination with a nucleating agent and an optical coupler. In addition, it may be so-called multiple structure particles having halogen compositions different between particle interior and particle surface. Especially those having a double structure among the multiple structure particles are sometimes called as a core-shell emulsion.

The silver halide emulsion used in the present invention is preferably a monodisperse emulsion, and an extent of the monodispersion preferably resides in not more than 20% expressed by a coefficient of variation as described in Japanese Patent Laid-open No. 3-110555. More preferably, it is not more than 16%, and still more preferably, it is not more than 10%. However, the present invention is not limited to the monodisperse emulsion. The silver halide particles used in the present invention have an average particle size which is 0.1 μm to 2.2 μm, preferably 0.1 μm to 1.2 μm. More preferably, it is 0.1 μm to 0.8 μm.

The crystal habit of the silver halide particles may be any of cube, octahedron, plate shape having a high aspect ratio, potato shape and the like, however, cube is preferable. Concretely, any of silver halide emulsions described in U.S. Pat. Nos. 4,500,626 (column 50) and 4,628,021, Research Disclosure journal (referred to herein as RD), 17029 (1978), Japanese Patent Laid-open No. 62-25159 and the like may be used.

The sensitizing dyes used for the present photosensitive material can be directly dispersed in the emulsion. These may be added after dissolving in a suitable solvent, for example, an organic solvent compatible with water such as methyl alcohol, ethyl alcohol, methyl cellosolve, acetone, fluorinated alcohol, dimethylformamide, propyl alcohol and the like or water (which may be either alkaline or acidic), or two or more species of those described above may be used in combination. Further, they may be added in a form dispersed in a water/gelatin dispersion system or in a form of lyophilized powder. Further, they may be added in a form of solution or powder dispersed using a surfactant.

With respect to a method for adding the thiadicarbocyanine sensitizing dye used in the present invention to the silver halide emulsion, if the emulsion can be agitated at not less than 50° C. and not more than 85° C. for not less than 15 minutes (preferably not less than 30 minutes) in the of presence of the sensitizing dye, it is possible to obtain a spectral sensitivity characteristic having good color separation. The sensitizing dye may be added at the beginning of or during formation of the silver halide emulsion particles or after the formation, or at the beginning of, during or after completion of a desalting step, or during resuspending of gelatin, or before, during or after chemical sensitization, or during preparation of an application liquid or the like. However, in order to obtain a high sensitivity and excellent shelf stability in a green state, it is more preferable to perform addition during or after completion of the formation of the silver halide particles, or before, during or after the chemical sensitization. Addition after the chemical sensitization is addition of the sensitizing dye after addition of all chemicals necessary for the chemical sensitization.

With respect to the adding method, addition may be performed at one time, or addition may be performed at several times in an identical step or over different steps. Addition may be performed gradually over a period.

It is preferable to perform addition with an adding amount of not less than 30% and not more than 150% of an absorption saturated coating amount. More preferably, the adding amount is not less than 50% and not more than 100%. In this case, the absorption saturated coating amount is an amount necessary for the sensitizing dye to coat all surfaces of the silver halide emulsion particles, which can be determined from an occupying area of the sensitizing dye on the silver halide emulsion particle surfaces.

Even in a case in which particle formation is inevitably performed at a low temperature not more than 50° C. when the sensitizing dye is added before or after formation of the silver halide particles and during the formation, the emulsion may be agitated for not less than 15 minutes in a state of not less than 50° C. and not more than 85° C. in following steps (for example, in the chemical sensitization), however, it is preferable that the temperature is raised to not less than 50° C. and not more than 85° C. after formation of emulsion particles to agitate the emulsion for not less than 15 minutes. It is also acceptable that the sensitizing dye is added in the state of not less than 50° C. and not more than 85° C. to agitate the emulsion. Upon addition of the sensitizing dye during the formation of the silver halide particles, if the sensitizing dye is added at once, since the adding amount of the sensitizing dye is in a region near the saturated coating amount, a problem of re-nucleation or the like may arise in the silver halide particle formation, so that the sensitizing dye may be added continuously, or may be added several times in a divided manner.

In addition, a soluble Ca compound, a soluble I compound, a soluble Br compound, a soluble Cl compound and/or a soluble SCN compound may be added together during and before or after addition of the sensitizing dye. Preferably, KI, $CaCl_2$, KCl, KBr, KSCN and the like may be used.

Details of photographic photosensitive elements containing the photosensitive emulsion of the present invention and treatment methods thereof are exactly described on page 16 to page 38 of a specification of Japanese Patent Application No. 5-96477.

Embodiments of the present invention will be explained hereinafter with reference to the attached drawings.

Figure 2:
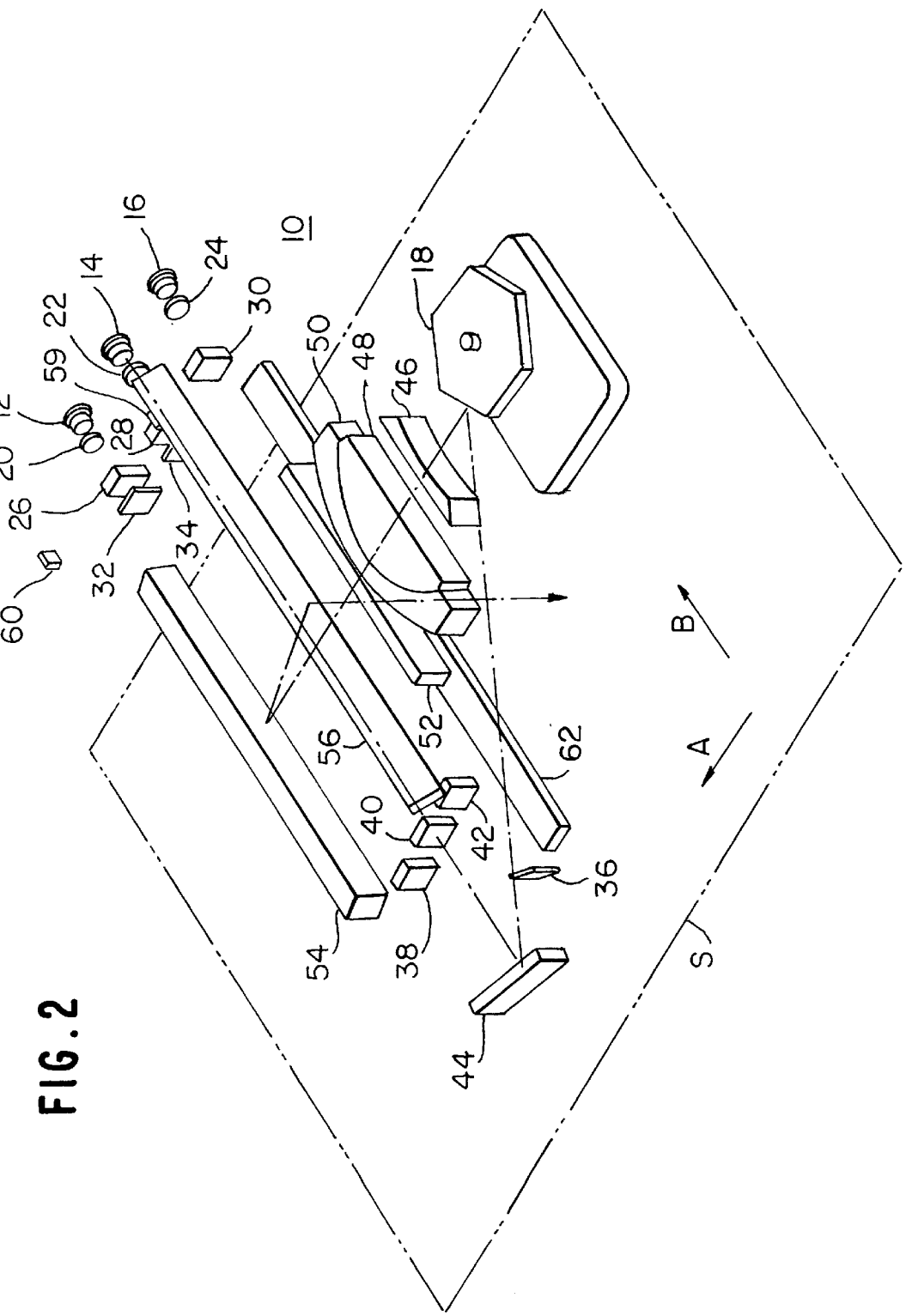
FIG. 2 is a perspective view of an exposing apparatus.
Figure 3:
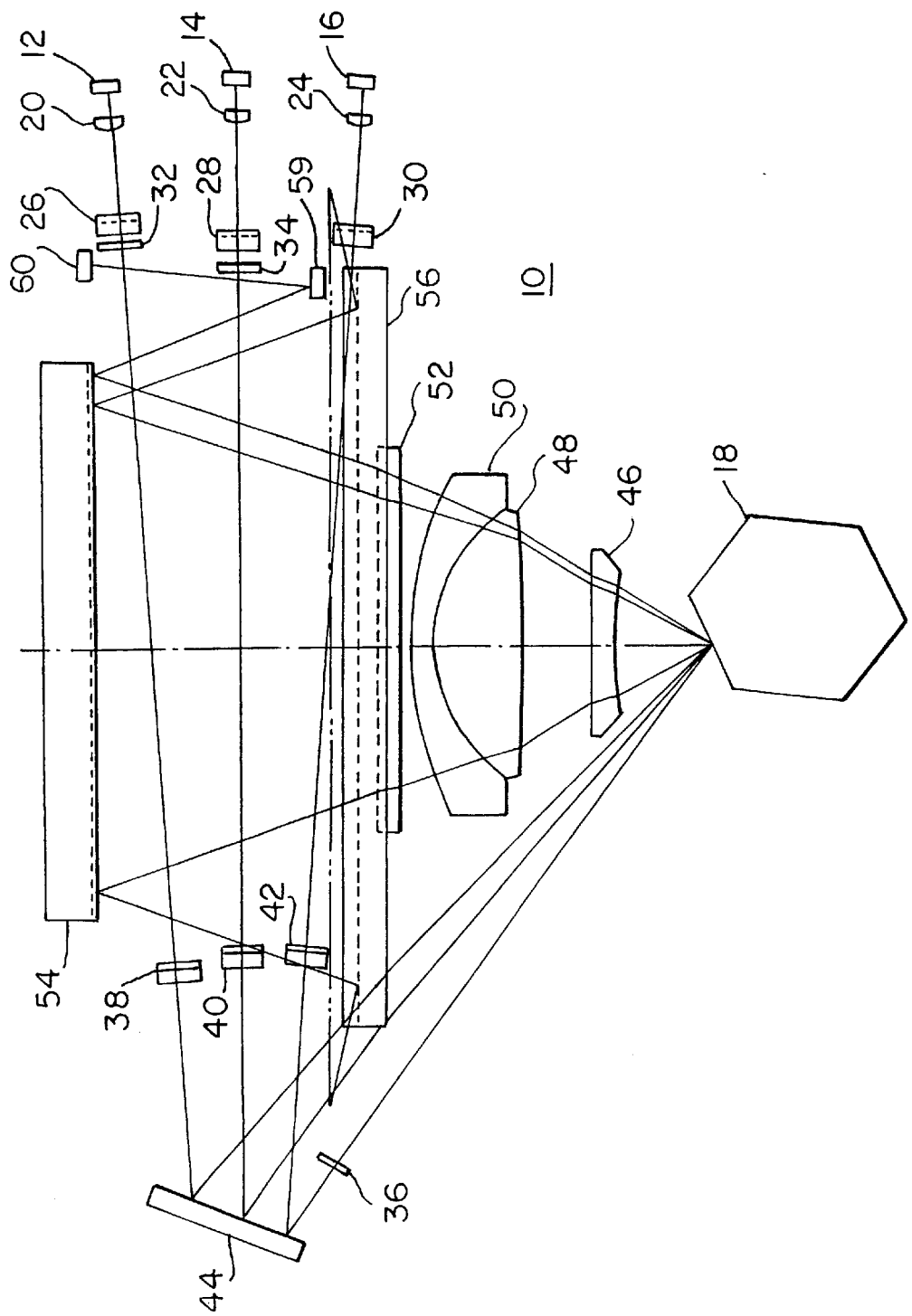
FIG. 3 is a plan view of the exposing apparatus.

FIG. 2 is a perspective view of an exposing apparatus 10 as an embodiment of the present invention, and FIG. 3 is a plan view of the exposing apparatus 10. A photosensitive material S, which is exposed by the exposing apparatus 10, is, for example, overlapped with a dye fixing material after exposure to perform heating development transfer in the presence of a solvent for image formation such as water. An image is formed on the dye fixing material by using the photosensitive material S and the dye fixing material. The photosensitive material S has a cyan color generation layer, a magenta color generation layer and a yellow color generation layer having different spectral sensitivities, respectively. The cyan color generation layer has a maximal value of sensitivity in the vicinity of 750 nm, and is exposed by light of 750 nm to form a latent image. The magenta color generation layer has a maximal value of sensitivity in the vicinity of 680 nm, and is exposed by light of 680 nm to form a latent image. The yellow color generation layer has a maximal value of sensitivity in the vicinity of 810 nm, and is exposed by light of 810 nm to form a latent image.

In this exposing apparatus 10, light beams having wavelengths of 680 nm, 750 nm and 810 nm respectively irradiated from three semiconductor lasers 12, 14 and 16 are reflected by a rotatable polygon mirror 18 to scan and expose the photosensitive material S. The latent image is made into a tangible image by developing the photosensitive material S after the exposure, and an image is formed on the photosensitive material S or the dye fixing material which is overlapped with the photosensitive material S to transfer the image thereonto.

The light beams having the different wavelengths from the three semiconductor lasers 12, 14 and 16, which are modulated on the basis of image information, are shaped by collimator lenses 20, 22, 24, and arrive at the polygon mirror 18 after passing through concave cylindrical lenses 26, 28 and 30, ND filters 32, 34 and 36, convex cylindrical lenses 38, 40 and 42, and a flat mirror 44. The laser beam of 750 nm passes through the ND filter 36 after being reflected by the flat mirror 44.

The light beam reflected by the polygon mirror 18 passes through three f θ lenses 46, 48 and 50 and a concave cylindrical lens 52, which is thereafter reflected by two cylindrical mirrors 54, 56, passes through a cover glass 62 and arrives at the photosensitive material S. During this event, the polygon mirror 18 rotates, thereby the laser beam reflection point on the polygon mirror 18 migrates to change the focusing point on the photosensitive material S, and consequently the laser beam performs main scanning on the photosensitive material S in a direction B perpendicular to a photosensitive material conveying direction A to make exposure. And every time when one scanning by the laser beam is finished, the photosensitive material S is conveyed in the sub-scanning direction A by means of a photosensitive material conveying mechanism (not shown), and the main scanning and sub-scanning are repeated predetermined times to expose an image of one image plane onto the photosensitive material S.

A sensor 60, which receives light reflected by the cylindrical mirror 54 after being further reflected by a mirror 59, is arranged on an extension of beam scanning and without an exposure region of the photosensitive material S. The laser beam is received by the sensor 60, so as to adjust the timing between the main scanning by the laser beam and the sub-scanning which is performed by conveyance of the photosensitive material S.

In the aforementioned construction, the three f θ lenses 46, 48 and 50 are arranged using the light of 750 nm which is an intermediate wavelength of light beams of the three wavelengths as a standard, wherein the distance between the focus position and the photosensitive material S is minimized over the entire region in the main scanning direction by the laser beam of 750 nm.

FIG. 1 is a figure showing optical paths in accordance with the specified arrangement of the optical system as an important part of the present invention, which shows optical paths in a plane including an optical axis 58 of the f θ lenses 46, 48 and 50.

The laser beam incoming into the rotating polygon mirror 18 is reflected by one surface of the polygon mirror 18. Scanning and exposure of the photosensitive material S are performed by rotation of the polygon mirror 18. In FIG. 1, a position A of the polygon mirror 18 shown by a solid line is a position at which the beam is reflected toward one end (a) of the main scanning, while a position B shown by a phantom line is a position at which the beam is reflected toward the other end (b) of the main scanning. In the figure, the polygon mirror 18 reflects the laser beam to make scanning from the position (a) to the position (b) while rotating in a clockwise direction from the position A to the position B.

The feature of the arrangement resides in that each of reflection points on the polygon mirror 18 at the both end positions of the laser beam scanning passes through an identical point on the optical axis 58 of the f θ lenses 46, 48 and 50, and the optical paths toward the both ends (a), (b) are in axial symmetry with respect to the optical axis 58 of the f θ lenses 46, 48 and 50. In such an arrangement relationship, in accordance with rotation of the polygon mirror 18, the reflection point C at which the laser beam directs to the end (a) and the reflection point D at which the laser beam directs to the end (b) pass through the identical point on the optical axis 58 of the f θ lenses 46, 48 and 50. Owing to the fact that the mirror reflection points C, D of the beams which direct to the both ends of beam scanning respectively pass through the identical point on the optical axis 58 of the f θ lenses 46, 48 and 50, and that the optical paths toward the ends (a), (b) are in axial symmetry with respect to the optical axis 58 of the f θ lenses 46, 48 and 50, the distances from the reflection points C, D to the photosensitive material S are equal, and beam diameters at the both ends of scanning become equal.

The f θ lenses 46, 48 and 50 function to allow the focus to be located approximately on the photosensitive material S over the entire region of the beam scanning, so that when the beam diameters at the both ends of the scanning become equal, the beam scanning width is symmetrical at the right and left with respect to the optical axis 58 owing to the function of the f θ lenses 46, 48 and 50. Therefore, variation in beam diameter on one scanning line by the laser beam can be disappeared substantially completely, and shading can be prevented.

In order to confirm the aforementioned arrangement relationship, the dimension of the beam diameter and the position of the focus plane may be measured at the both ends of the scanning, and when they are equal at the both ends of the scanning, it can be said that the beam scanning lines are symmetrical with respect to the optical axis 58 of the f θ lenses 46, 48 and 50. And the fact that the beam scanning lines are symmetrical with respect to the optical axis 58 of the f θ lenses 46, 48 and 50 means that the reflection points corresponding to the scanning end portions of the polygon mirror 18 pass through the identical point on the optical axis 58 of the f θ lenses 46, 48 and 50.

When the arrangement of the aforementioned relationship is set using the laser beam of 750 nm as a standard, variation in beam diameter is suppressed in exposure by the laser beam of 750 nm. Designing an optical system based on the light of the wavelength of 750 nm which is the intermediate wavelength of the three wavelengths of 680 nm, 750 nm and 810 nm can further reduce the curvature of field of light of the other two wavelengths. Therefore, when exposure is performed in the aforementioned construction onto the color generation layer which has the maximal spectral sensitivity in the vicinity of 750 nm and of which the color generation density greatly depends on variation in beam diameter, it is sufficient that the optical system is set and arranged using the laser beam of 750 nm as the standard, and the polygon mirror 18 and the f θ lenses 46, 48 and 50 are arranged such that the reflection points corresponding to the both ends of beam scanning on the reflection surfaces of the polygon mirror 18 pass through the identical point on the optical axis 58 of the f θ lenses 46, 48 and 50, and the light beams at the both ends of beam scanning are in axial symmetry with respect to the optical axis 58 of the f θ lenses 46, 48 and 50. Accordingly, setting of the optical system is extremely easy.

When the color generation layer in which the color generation density depends on variation in beam diameter is exposed by the laser beam of 750 nm, it is possible to prevent its color from shading. Although the curvature of field occurs in the laser beam of 680 nm which is shorter in wavelength than it and in the laser beam of 810 nm which is longer in wavelength than it, layers having less color generation density dependency on variation in beam diameter can be used for the color generation layers exposed by the laser beams of 680 nm and 810 nm.

When the color generation layer in which the color generation density greatly depends on variation in beam diameter is exposed using the exposing apparatus of the aforementioned construction by means of the laser beam of 750 nm, shading in the color generation layer can be prevented, and an image of high image quality can be formed. As the color generation layer having dependency on variation in beam diameter, there are those containing a silver halide emulsion spectrally sensitized by a thiadicarbocyanine dye. The silver halide emulsion spectrally sensitized by the thiadicarbocyanine dye has such a characteristic that it forms the J aggregate, and the maximal spectral sensitivity $S_0$ deviates toward a long wavelength side, wherein the spectral sensitivity $S_1$ greatly lowers from the aforementioned maximal spectral sensitivity at a wavelength further longer than the wavelength of the maximal spectral sensitivity $S_0$ by about 20 nm. Therefore, in the case of the color generation layer containing such a silver halide emulsion, the variation in beam diameter greatly affects the color generation density, and shading occurs. Thus, when this color generation layer is exposed in accordance with the present invention, it is possible to perform accurate exposure in which there is little variation in beam diameter.

There are those containing a silver halide emulsion which contains a thiadicarbocyanine dye as a spectral sensitizing agent, and is spectrally sensitized such that a maximal spectral sensitivity $S_0$ appears between 700 nm and 900 nm, and a spectral sensitivity $S_1$ with respect to light having a wavelength longer than the wavelength of the maximal spectral sensitivity $S_0$ by 20 nm is not more than ⅓ of the maximal spectral sensitivity $S_0$. The aforementioned exposing apparatus is preferable to expose a photosensitive material spectrally sensitized in such a manner.

The color generation layer spectrally sensitized as described above has large dependency of the color generation density on variation in beam diameter because change in sensitivity in the vicinity of the maximal spectral sensitivity is steep, however, it also has a characteristic that color separation is good. Therefore, when exposure is performed using the exposing apparatus of the aforementioned construction onto the color generation layer spectrally sensitized at the aforementioned wavelength by the thiadicarbocyanine dye, it is possible to form a good image in which color separation is good, and there is no shading.

As the photosensitive material which generates color by being exposed to the laser beams of the three wavelengths of 680 nm, 750 nm and 810 nm, there is a combined silver halide color photosensitive material in which a color of magenta is generated by the laser beam of 680 nm, a color of cyan is generated by the laser beam of 750 nm, and a color of yellow is generated by the laser beam of 810 nm. When this photosensitive material is exposed using the exposing apparatus of the aforementioned construction, there is provided an effect that shading is reduced in cyan color generation, and color separation becomes good.

TEST EXAMPLE

The photosensitive material is formed by laminating, by known methods, seven layers including a yellow color generation layer (first layer), a cyan color generation layer (third layer) and a magenta color generation layer (fifth layer), on a paper support (thickness 96 $\mu$m) which has been laminated with polyethylene.

When the silver halide emulsions of the first, third and fifth layers are chemically sensitized, sensitizing color components represented by the following formulae are added to the emulsion compositions respectively.

First Layer

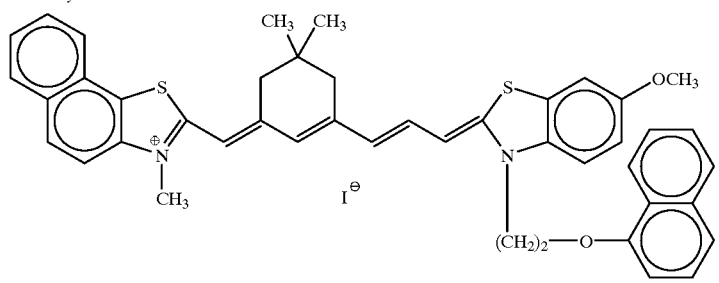

Third Layer

A combination of the compounds represented by formula (3) (D-1: 33%, D-17: 67%)

Fifth Layer

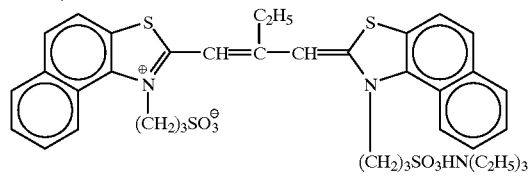

Figure 4A:
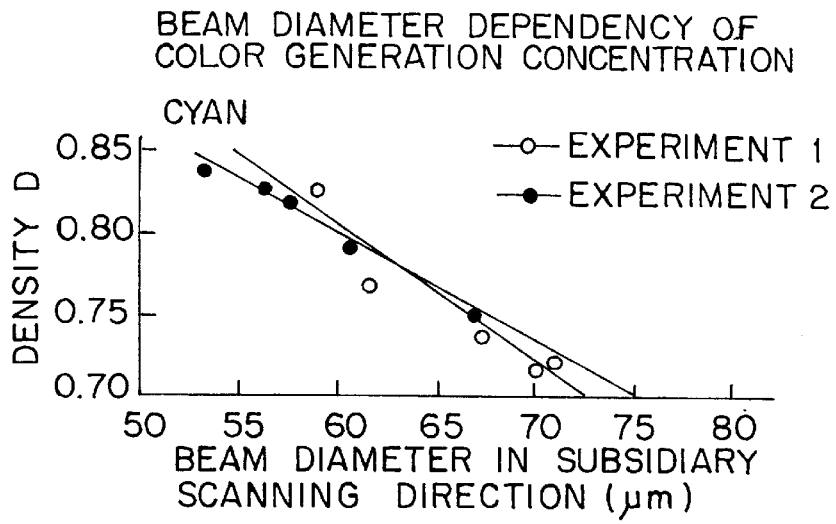
FIG. 4(A) is a graph showing beam diameter dependency of a cyan color generation density of a photosensitive material.
Figure 4B:
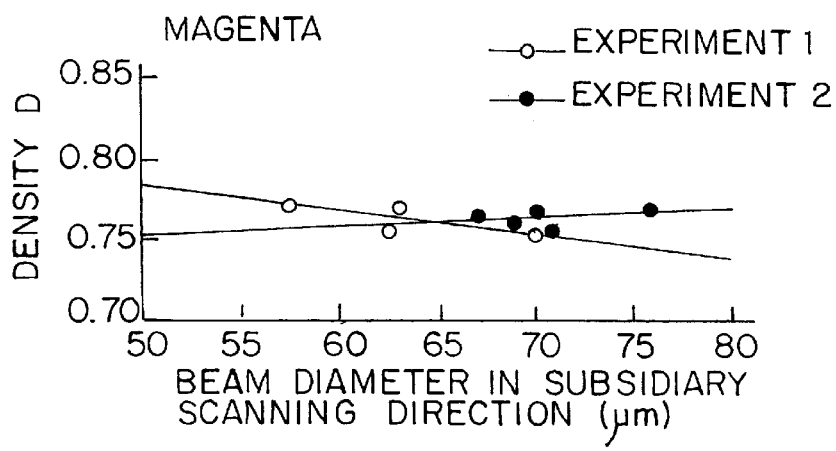
FIG. 4(B) is a graph showing beam diameter dependency of a magenta color generation density of a photosensitive material.
Figure 4C:
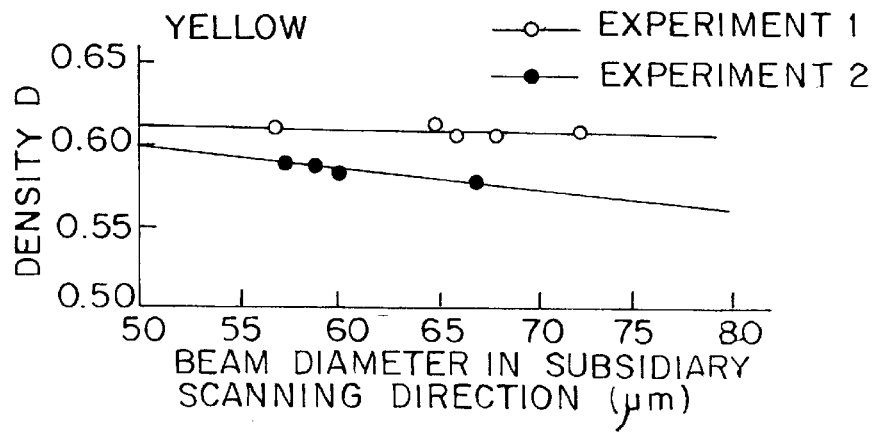
FIG. 4(C) is a graph showing beam diameter dependency of a yellow color generation density of a photosensitive material.

FIGS. 4 (A)–(C) are graphs showing beam diameter dependency of the color generation density of the sample, in which experimental data are given for a cyan color generation layer in FIG. 4(A), for a magenta color generation layer in FIG. 4(B), and for a yellow color generation layer in FIG. 4(C). As seen from FIGS. 4 (A)–(C), this photosensitive material has such a characteristic that with respect to the cyan color generation layer, the density lowers by about 0.15 when the beam diameter in the sub-scanning direction increases by about 20 nm, the density greatly rises when the beam diameter decreases, and the density greatly lowers when the beam diameter increases. On the contrary, with respect to the magenta color generation layer and the yellow color generation layer, variation in density in accordance with variation in beam diameter is small.

Using the aforementioned photosensitive material, an optical system described in FIG. 2 was set in the positional relationship shown in FIG. 1. The image recording device 10 illustrated in FIG. 2 was used as an optical system. In image recording device 10, the three light beams from the light sources 12, 14, 16 are entered, at angles which respectively differ slightly, on approximately the same point on the reflection surface of the polygon mirror 18. The light beams are deflected in the main scanning direction so as to form images at different positions on the same main scan line on the photosensitive material. Namely, the image recording device 10 is an optical system of the type in which the light beams are successively scanned on the same scan line at different times so as to be illuminated onto the photosensitive material at different angles. In the image recording device 10, the respective optical members of the light sources 12, 14, 16, the flat mirror 44, and the polygon mirror 18 are disposed such that the optical paths of the light beams from the light source to the flat mirror 44 and the optical paths of the light beams deflected in the main scanning direction by the polygon mirror 18 intersect in substantially the same plane. The photosensitive material is conveyed in the sub-scanning direction (the direction of arrow A) by a sub-scanning transporting means such as a pair of nip rollers (unillustrated) between which the scan line of the light beams are interposed, or nip rollers between which an exposure drum (unillustrated) and the scan line are interposed and which are pushed against the exposure drum. Accordingly, image recording can be effected by the light beams, which are deflected in the main scanning direction (the direction of arrow B), scanning and exposing the photosensitive material in two dimensions.

Exposure was performed under the following exposure conditions.

Beam power on photosensitive material surface:

laser beam power at 675 nm: 60 $\mu$w laser beam power at 755 nm: 250 $\mu$w laser beam power at 815 nm: 250 $\mu$w Scanning line density: 1600 dpi (63 rasters per 1 mm)

| Beam diameter: | 85 ± 8.5 $\mu$m in main scanning direction |
| --- | --- |
| | 55 ± 5.5 $\mu$m in sub-scanning direction |
| Exposure time: | 667 $\mu$sec per 1 raster |
| | repeating cycle: 1.33 msec |

Exposure wavelength: 675, 755, 815 nm (laser beam)

| Exposure amount: | change by 1 logE per 2.5 cm in sub-scanning direction |
|---|---|

Exposure amount changing method: emitting time modulation (Pulse Width Modulation method described in Japanese Patent Laid-open No. 5-199372, the disclosure of which is incorporated herein by a reference)

Water of 11 ml/m² was supplied by a wire bar to an emulsion surface of an exposed photosensitive material, followed by overlapping to allow a dye fixing material to contact with a film surface. The water-absorbed film was heated to 83° C. over 30 seconds by a heat drum which was temperature controlled, and thereafter the dye fixing material was peeled off from the photosensitive material to obtain an image on the dye fixing material. The spectral sensitivity was measured such that each photosensitive material was exposed to a series of monochrome light through a wedge for 1 second to perform the treatment in the same manner as described above.

A result of the treatment is shown in FIG. 5. FIG. 5 shows cyan color generation densities at each of positions in the beam main scanning direction. The measurement of the color generation density was performed for three places of a center (●, 0 cm), +80 cm (○) and −80 cm (◇) as positions in the beam sub-scanning direction. As clarified from the result shown in FIG. 5, it is understood that as a result of exposure according to the present invention, the density change over the main scanning direction is about 0.04–0.05 at any position in the sub-scanning direction, and the density change in the main scanning direction is extremely small. According to this fact, it can be said that when exposure is performed in accordance with the present invention, variation in beam diameter in the main scanning direction is suppressed, and variation in density in the main scanning direction is reduced. As a result of the aforementioned actual measurement, it could be confirmed that the image obtained by cyan color generation was good in which shading was reduced.

On the contrary, a result of exposure by a conventional exposing apparatus is shown in FIG. 6. As clarified from the result shown in FIG. 6, there is variation in density due to the fact that variation in beam diameter in the main scanning direction is large at any of positions in the sub-scanning direction, and the density change over the main scanning direction is about 0.14 which is large. From this fact, it is understood that the shading reduction effect according to the present invention is extremely large.

In the aforementioned embodiment, the photosensitive material S, in which the image is formed on the dye fixing material by heat development transfer, has been used, however, any development system is acceptable for the photosensitive material in the present invention.

According to the present invention, the aforementioned polygon mirror and the f θ lenses are arranged such that the reflection points corresponding to the both ends of beam scanning on the reflection surfaces of the polygon mirror pass through the identical point on the optical axis of the f θ lenses, thereby the beam diameters at the both end portions of the beam scanning become equal, and the beam scanning becomes symmetrical at the both sides of the optical axis of the f θ lenses, so that shading resulting from variation in beam diameter can be reduced. In addition, a good image is formed only by setting the optical system to be in the aforementioned relationship with respect to the light source for exposing the color generation layer in which the color generation density greatly depends on variation in beam diameter, so that adjustment for reduction in shading is extremely easy.

What is claimed is:

1. An apparatus for exposing photosensitive materials comprising:
   a plurality of light sources for generating beams having different wavelengths;
   a rotatable polygon mirror for scanning and exposing a photosensitive material by reflecting the beams toward the photosensitive material; and
   one or more f θ lenses disposed on an optical path between the photosensitive material and said polygon mirror;
   wherein said polygon mirror and said f θ lenses are arranged, with respect to the beam from a light source having an intermediate wavelength among said light sources, such that reflection points corresponding to both ends of beam scanning on reflection surfaces of said polygon mirror pass through an identical point on an optical axis of said f θ lenses, and light beams at the both ends of beam scanning have line symmetry with respect to the optical axis of said f θ lenses; and
   wherein the beam diameters at the both ends in the scanning direction become equal.

2. An apparatus for exposing photosensitive materials comprising:
   a plurality of light sources for generating beams having different wavelengths;
   a rotatable polygon mirror for scanning and exposing a photosensitive material by reflecting the beams toward the photosensitive material; and
   one or more f θ lenses disposed on an optical path between the photosensitive material and said polygon mirror;
   wherein said polygon mirror and said f θ lenses are arranged, with respect to the beam from a light source having an intermediate wavelength among said light sources, such that reflection points corresponding to both ends of beam scanning on reflection surfaces of said polygon mirror pass through an identical point on an optical axis of said f θ lenses, and light beams at the both ends of beam scanning have line symmetry with respect to the optical axis of said f θ lenses;
   wherein said photosensitive material has a silver halide emulsion layer having a steep spectral sensitivity distribution in an infrared region; and
   wherein the beam diameters at the both ends in the scanning direction become equal.

3. An apparatus for exposing photosensitive materials comprising:
   a plurality of light sources for generating beams having different wavelengths;
   a rotatable polygon mirror for scanning and exposing a photosensitive material by reflecting the beams toward the photosensitive material; and
   one or more f θ lenses disposed on an optical path between the photosensitive material and said polygon mirror;
   wherein said photosensitive material has at least one layer of a silver halide emulsion layer spectrally sensitized by a sensitizing dye for forming a J aggregate, and wherein said polygon mirror and said f θ lenses are arranged, with respect to the beam from a light source among said light sources having a wavelength which is selected to expose the silver halide emulsion layer spectrally sensitized by the sensitizing dye for forming the J aggregate, such that reflection points corresponding to both ends of beam scanning on reflection surfaces of said polygon mirror pass through an identical point on an optical axis of said f θ lenses, and light beams at the both ends of beam scanning have line symmetry with respect to the optical axis of said f θ lenses; and wherein the beam diameters at the both ends in the scanning direction become equal.

4. The apparatus for exposing photosensitive materials according to claim 3 wherein said photosensitive material is spectrally sensitized by using a dye represented by the following general formula (1) or (2):

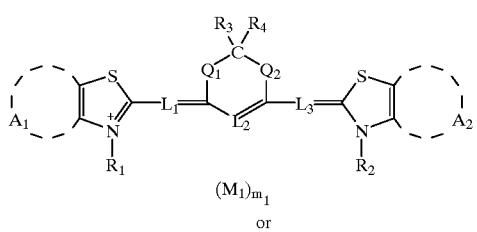

(1)

or

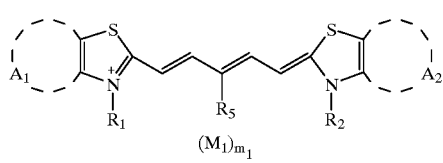

(2)

wherein $Q_1$ and $Q_2$ represent a methylene group respectively; $R_1$ and $R_2$ represent an alkyl group respectively; $R_3$ and $R_4$ represent a hydrogen atom, an alkyl group, an aryl group or a heterocyclic group respectively; at least one of $R_3$ and $R_4$ is an alkyl group, an aryl group or a heterocyclic group; $L_1$, $L_2$ and $L_3$ represent a methine group respectively; $A_1$ and $A_2$ represent an atom group necessary to form a benzene ring or a naphthalene ring respectively; $M_1$ represents an electric charge-balanced counter ion; and $m_1$ represent a value necessary to neutralize an electric charge.

* * * * *